(12) United States Patent
Nagahara

(10) Patent No.: US 6,801,367 B2
(45) Date of Patent: Oct. 5, 2004

(54) ZOOM LENS AND PROJECTION DISPLAY DEVICE WHICH USES SAME

(75) Inventor: Akiko Nagahara, Koshigaya (JP)

(73) Assignee: Fuji Photo Optical Co., Ltd., Saitama (JP)

(*) Notice: Subject to any disclaimer, the term of this patent is extended or adjusted under 35 U.S.C. 154(b) by 0 days.

(21) Appl. No.: 10/457,655

(22) Filed: Jun. 10, 2003

(65) Prior Publication Data
US 2003/0234984 A1 Dec. 25, 2003

(30) Foreign Application Priority Data
Jun. 12, 2002 (JP) .................................. 2002-171462

(51) Int. Cl.$^7$ .......................... G02B 15/14; G02B 3/00; G02B 9/00
(52) U.S. Cl. ...................... 359/680; 359/676; 359/649
(58) Field of Search .............................. 359/649, 676, 359/680, 682, 683

(56) References Cited

U.S. PATENT DOCUMENTS

| | | | | |
|---|---|---|---|---|
| 6,008,952 A | * | 12/1999 | Yamamoto | 359/683 |
| 6,222,680 B1 | * | 4/2001 | Yamamoto et al. | 359/680 |
| 6,480,340 B1 | * | 11/2002 | Yamamoto | 359/676 |
| 6,580,564 B2 | * | 6/2003 | Nagahara | 359/683 |
| 2001/0050818 A1 | * | 12/2001 | Wada et al. | 359/649 |
| 2002/0176058 A1 | * | 11/2002 | Yasui et al. | 353/100 |
| 2002/0181120 A1 | * | 12/2002 | Nagahara | 359/683 |
| 2003/0184874 A1 | * | 10/2003 | Nagahara | 359/680 |
| 2003/0231404 A1 | * | 12/2003 | Nagahara | 359/680 |

FOREIGN PATENT DOCUMENTS

| | | |
|---|---|---|
| JP | 10-268193 | 10/1998 |
| JP | 2000-292701 | 10/2000 |
| JP | 2001-4919 | 1/2001 |
| JP | 2001-235679 | 8/2001 |
| JP | 2001-350094 | 12/2001 |
| JP | 2001-350096 | 12/2001 |

* cited by examiner

Primary Examiner—David N. Spector
(74) Attorney, Agent, or Firm—Arnold International; Jon W. Henry; Bruce Y. Arnold

(57) ABSTRACT

A zoom lens includes, in order from the enlarging side, a first lens group that has negative refractive power, is movable for focusing, and is stationary during zooming, second, third, fourth, and fifth lens groups that are movable for zooming, and a sixth lens group that is stationary during zooming. The second, fourth, and sixth lens groups have positive refractive power and the fifth lens group has negative refractive power. The second and fourth lens groups move nearer the enlarging side when the zoom lens zooms toward the telephoto end, and the fifth lens group is nearer the enlarging side at the zoom lens telephoto end than at the zoom lens wide-angle end. The ratios of the focal lengths of the first, third, and fifth lens groups to the focal length of the zoom lens satisfy three conditions. A projection display device uses the zoom lens.

23 Claims, 7 Drawing Sheets

ZOOM LENS AND PROJECTION DISPLAY DEVICE WHICH USES SAME

BACKGROUND OF THE INVENTION

Projection display devices that use zoom lenses, are known. Japanese Laid-Open Patent Application H10-268193, Japanese Laid-Open Patent Application 2000-292701, and Japanese Laid-Open Patent Application 2001-004919 disclose five group zoom lenses in which three lens groups move to control zooming.

In general, zoom lenses for projection display devices need to provide a bright image based on the use of a liquid crystal image source of limited brightness. Additionally, the zoom lens needs to be compact to achieve the desired small size of the projection display device. In recent years, there has been a demand to be able to project the image from a short distance to a large screen by using a wider wide-angle projection lens in the projection display device. Furthermore, a larger zooming ratio is being demanded.

In addition, for use in a projection display device with a liquid crystal image source, a prerequisite for the projection zoom lens is that it be telecentric or nearly telecentric on the reducing side, that is, the side where the liquid crystal image source is present. Furthermore, it is necessary to provide an adequate back focus distance in order to insert an optical system for color synthesis in projection display devices (or for color separation in color separation imaging systems) between the lens system and the imaging plane.

Also, higher definition images have been increasingly demanded in the projection display device, as well as further improvement in various aberrations in the middle range of zooming with three lens groups moving for zooming, as described above.

Improvements have been sought by the use of six-group zoom lenses with four moving lens groups as disclosed in Japanese Laid-Open Patent Application 2001-350094, Japanese Laid-Open Patent Application 2001-235679, and Japanese Laid-Open Patent Application 2001-350096. However, none of these three published Japanese applications suggest improvements to the various aberrations in the middle range of zooming. Additionally, the zoom lenses of these three published Japanese applications are unsatisfactory for at least the following reasons. In Japanese Laid-Open Patent Application 2001-350094 and Japanese Laid-Open Patent Application 2001-235679, a maximum angle of view of approximately 52° is achieved, but the correction of chromatic aberration is unsatisfactory. In Japanese Laid-Open Patent Application 2001-350096, a maximum angle of view of about 51° is achieved, but the overall size of the projection optical system is too large. In addition, the fifth lens group from the enlarging side moves nearer the reducing side during zooming toward the telephoto end. That requires more space for moving the fifth lens group, which, in turn, makes it difficult to increase the zoom ratio while maintaining compactness of the projection display device.

BRIEF SUMMARY OF THE INVENTION

The present invention relates to a zoom lens that includes six lens groups, four of which move for zooming, and in which various aberrations are favorably corrected. The required space for lens group movements during zooming is small, the zoom lens is compact, and has a large zoom ratio with a wide-angle of view and a bright image. The present invention further relates to a projection display device, such as a projection television, that uses such a zoom lens with, for example, a liquid crystal image source. Additionally, the present invention relates to cameras that use such a zoom lens for imaging onto an image detector such as a CCD, a camera tube element, photographic film, or similar devices.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

First, definitions of the terms "lens element," "lens component," and "lens group," that relate to the following detailed description will be given. The term "lens element" is herein defined as a single transparent mass of refractive material having two opposed refracting surfaces, which surfaces are positioned at least generally transversely of the optical axis of the zoom lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus some lens elements may also be lens components. Therefore, the terms "lens element" and "lens component" should not be taken as mutually exclusive terms. In fact, the terms may be used to describe a single lens element in accordance with part (a) above of the definition of a "lens component."

The term "lens group" is herein defined as a group of one or more lens components in optical series along an optical axis that, for known purposes of lens evaluation and lens design, may be considered equivalent to a single lens element. Known lens design and evaluation techniques determine whether a group of one or more lens components in optical series is properly considered a lens group. As more precise lens evaluation and lens design techniques are considered, a lens group that includes more than one lens component may be divided into further lens groups, and that process of division may proceed, in some cases, until a lens group that includes only one lens component is identified.

Additionally, as used herein, the term "negative" preceding a lens element, lens component, or lens group means that the lens element, lens component, or lens group (as a whole) has a negative refractive power. Similarly, as used herein, the term "positive" preceding a lens element, lens component, or lens group means that the lens element, lens component, or lens group (as a whole) has a positive refractive power.

Figure 1:
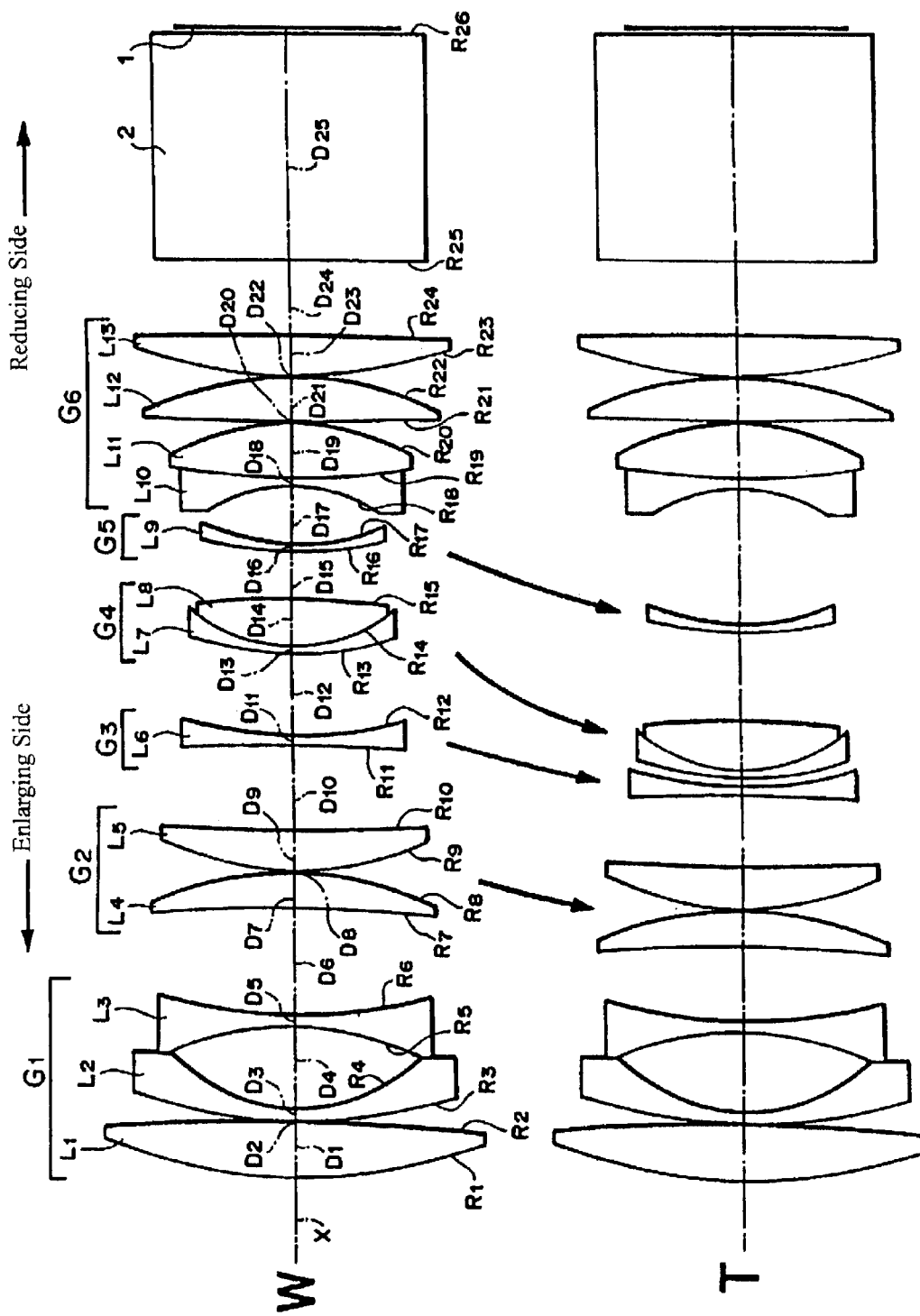
FIG. 1 shows cross-sectional views of the zoom lens of Embodiment 1 at the wide-angle end W and the telephoto end T.
Figure 2:
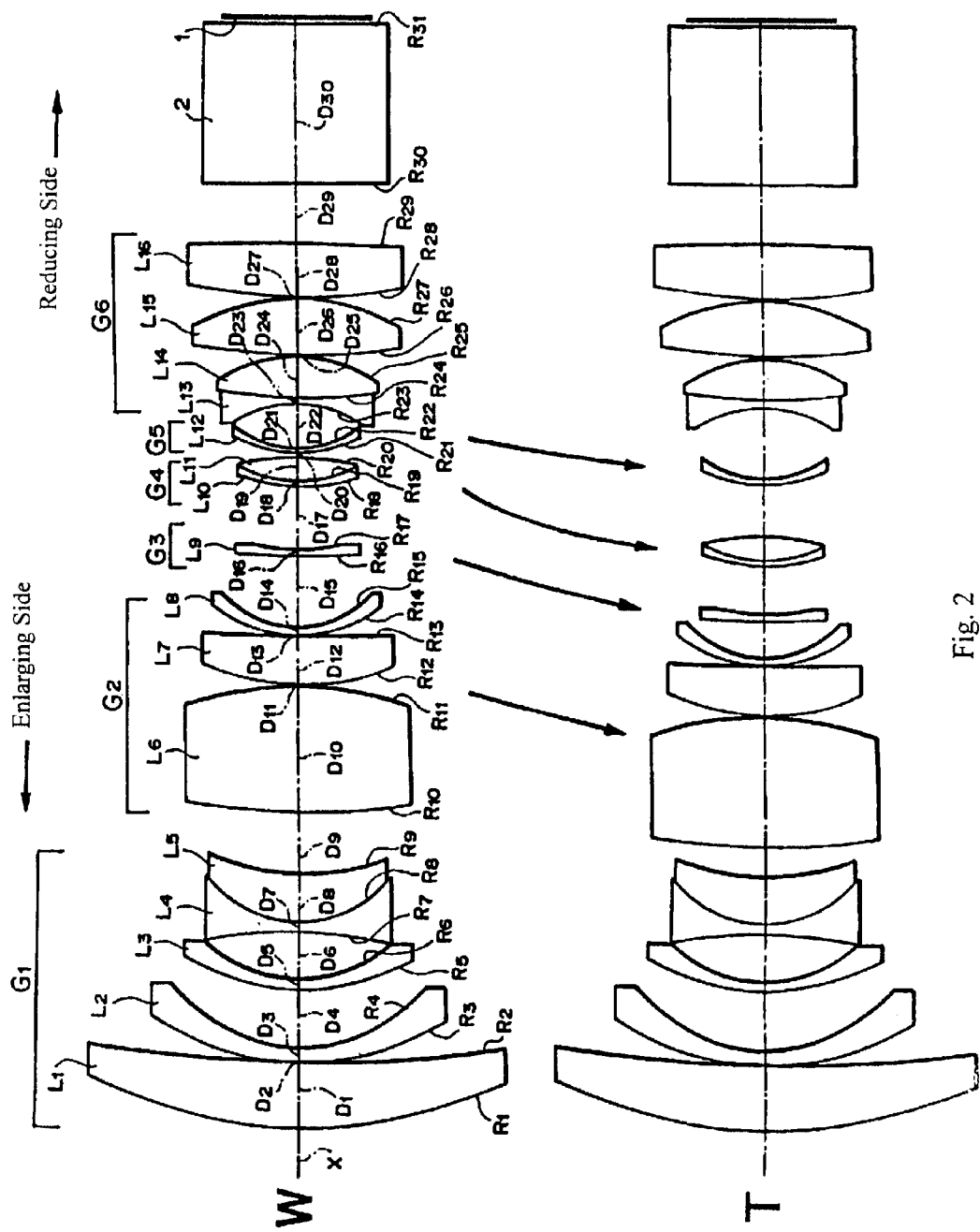
FIG. 2 shows cross-sectional views of the zoom lens of Embodiment 2 at the wide-angle end W and the telephoto end T.
Figure 3:
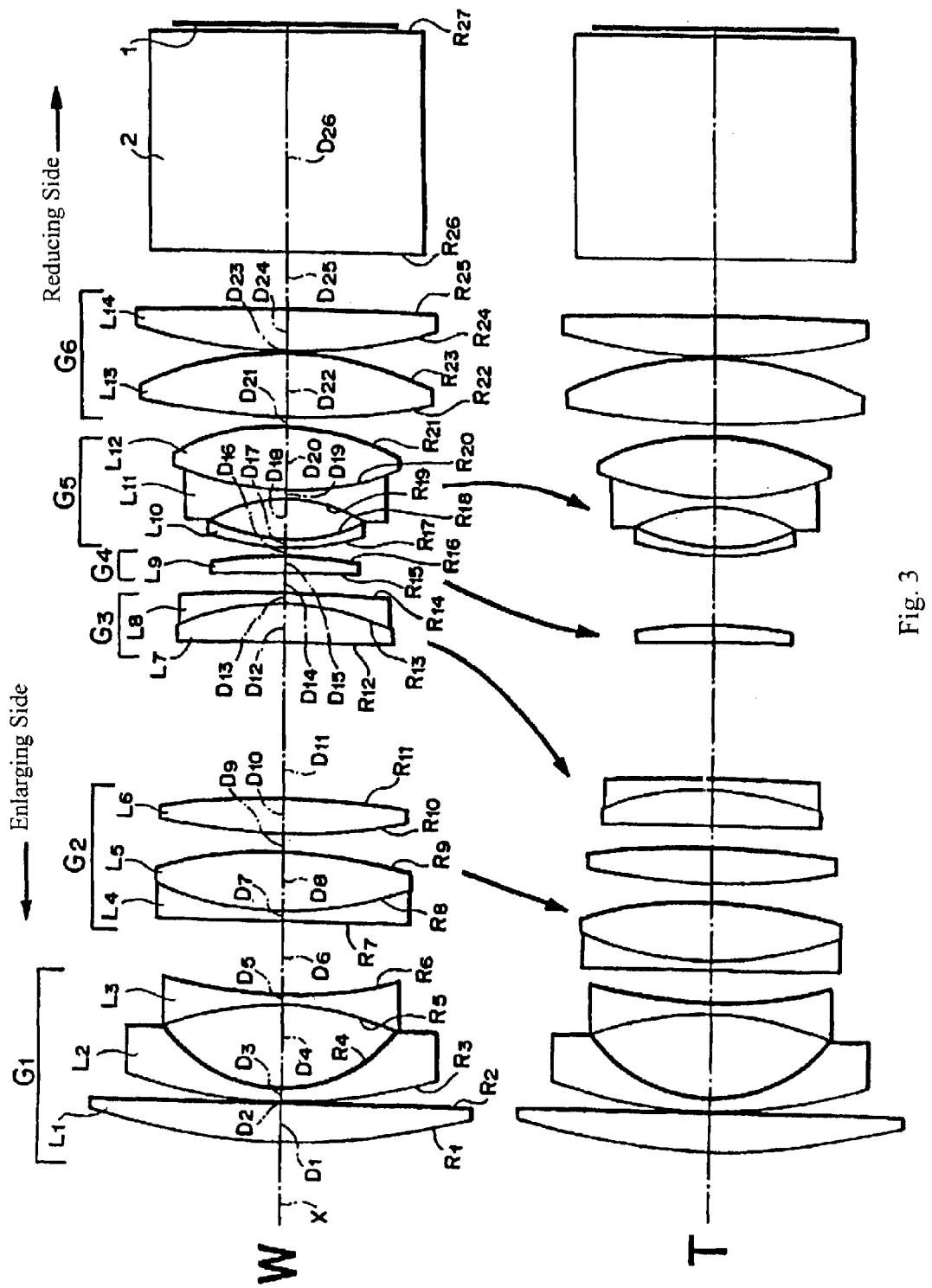
FIG. 3 shows cross-sectional views of the zoom lens of Embodiment 3 at the wide-angle end W and the telephoto end T.

A general description of the preferred embodiments of the zoom lens of the present invention will now be described with reference to FIGS. 1–3 that show Embodiments 1–3, respectively, with regard to similarities and differences of Embodiments 1–3. In FIG. 1, lens groups are referenced by the letter G followed by a number denoting their order from the enlarging side of the zoom lens, from $G_1$ to $G_6$, along the optical axis X. Lens elements are referenced by the letter L followed by a number denoting their order from the enlarging side of the zoom lens, from $L_1$ to $L_{13}$ for Embodiment 1 that follows, from $L_1$ to $L_{16}$ for Embodiment 2 that follows, and from $L_1$ to $L_{14}$ for Embodiment 3 that follows. In Embodiments 1–3, as shown in FIGS. 1–3, respectively, an upper left arrow points toward the enlarging side and an upper right arrow points toward the reducing side. Reference numeral 2 denotes a color synthesizing optical system, such as a color synthesizing prism, and reference numeral 1 denotes a liquid crystal display panel that serves as an image source. Radii of curvature of the optical surfaces of all the optical elements are referenced by the letter R followed by a number denoting their order from the enlarging side of the zoom lens, from $R_1$ to $R_{26}$ for Embodiment 1 that follows, from $R_1$ to $R_{31}$ for Embodiment 2 that follows, and from $R_1$ to $R_{27}$ for Embodiment 3 that follows. The on-axis surface spacings along the optical axis X of all the optical element surfaces are referenced by the letter D followed by a number denoting their order from the enlarging side of the zoom lens, from $D_1$ to $D_{25}$ for Embodiment 1 that follows, from $D_1$ to $D_{30}$ for Embodiment 2 that follows, and from $D_1$ to $D_{26}$ for Embodiment 3 that follows. The top parts of FIGS. 1–3 show the positions of the six lens groups at the wide-angle end, indicated by the letter "W," and the bottom parts of the FIGS. 1–3 show the positions of the six lens groups at the telephoto end, indicated by the letter "T."

With further reference to Embodiment 1, as shown in FIG. 1, a zoom lens according to the present invention includes, in order from the enlarging side, a first lens group $G_1$ having negative refractive power for focusing and that is stationary at the time of zooming, a second lens group $G_2$ having positive refractive power, a third lens group $G_3$ that may have positive or negative refractive power (and in Embodiment 1 has negative refractive power), a fourth lens group $G_4$ having positive refractive power, a fifth lens group $G_5$ having negative refractive power, and a sixth lens group $G_6$ having positive refractive power that is a relay lens and that is stationary at the time of zooming. The third lens group $G_3$ has at least one lens element having negative refractive power (the sixth lens element $L_6$ in FIG. 1). Lens groups $G_2$, $G_3$, $G_4$, and $G_5$, move to provide zooming and adjustment of the image plane due to zooming. Lens groups $G_2$, $G_3$, $G_4$, and $G_5$ move relative to one another along the optical axis during zooming. The second lens group $G_2$, third lens group $G_3$, and fourth lens group $G_4$ move continuously toward the enlarging side during zooming from the wide-angle end to the telephoto end.

As shown in FIGS. 1 and 2, in Embodiments 1 and 2, the fifth lens group $G_5$ also moves continuously toward the enlarging side during zooming from the wide-angle end to the telephoto end, but in Embodiment 3, as shown in FIG. 3, the fifth lens group $G_5$ moves nearer the reducing side at an intermediate focal length position as it moves from the wide-angle end to the telephoto end where, at the telephoto end, the fifth lens group $G_5$ is nearer the enlarging side than at the wide-angle end. Preferably, the fifth lens group $G_5$ includes a meniscus lens element having negative refractive power (the ninth lens $L_9$ in FIG. 1) with its convex lens surface on the enlarging side. The position of the fifth lens group $G_5$ is nearer the enlarging side in the telephoto position of the zoom lens than in the wide-angle position of the zoom lens. The color synthesizing optical system 2 is positioned between the sixth lens group $G_6$ and the liquid crystal display panel 1 that serves as an image source.

Preferably, the following condition is satisfied:

$$|F3|/F > 2.5 \qquad \text{Condition (1)}$$

where

F3 is the focal length of the third lens group $G_3$, and

F is the focal length of the zoom lens at the wide-angle end when the zoom lens is focused at infinity on the enlarging side.

If Condition (1) above is not satisfied, the amount of aberration that occurs in the third lens group $G_3$ tends to increase, and it becomes difficult to correct for movement of the image plane during zooming.

Additionally, preferably the following condition is satisfied:

$$0.7 < |F1|/F < 1.2 \qquad \text{Condition (2)}$$

where

F1 is the focal length of the first lens group $G_1$, and

F is as defined above.

If the above ratio of Condition (2) is larger than the upper limit, the negative refractive power of the first lens group $G_1$ tends to decrease, making aberration correction of the zoom lens with a small focal length F difficult, and making variations in aberrations increase because of the greater amount of movement required of the first lens group $G_1$ to obtain an in-focus image. On the other hand, if the above ratio of Condition (2) is smaller than the lower limit of Condition (2), aberration correction, particularly correction of distortion aberration and spherical aberration, becomes difficult because on-axis beams are spread too far from the optical axis X by the first lens group $G_1$. Additionally, the external diameters of the second lens group $G_2$ through the fifth lens group $G_5$, which are the moving groups, become larger.

Also, preferably the following condition is satisfied:

$$1.1 < F6/F < 2.5 \qquad \text{Condition (3)}$$

where

F6 is the focal length of the sixth lens group $G_6$, and

F is as defined above.

If the above ratio of Condition (3) is smaller than the lower limit of Condition (3), the positive refractive power of the sixth lens group $G_6$ tends to increase, which tends to decrease the back focus distance, as well as making it difficult to obtain a telecentric or nearly telecentric condition on the reducing side. The phrase "nearly telecentric" means that slight variations from exact telecentricity may occur at various image heights at least at some zoom settings but that the variations remain small in comparison to comparable prior zoom lenses that do not include telecentricity in their design criteria. By satisfying the lower limit value of Condition (3), the zoom lens can maintain a desired focus, including one that allows a back focus distance sufficient for interposing a color synthesizing optical system 2, which is necessary to project a color image. On the other hand, if the above ratio of Condition (3) is larger than the upper limit of Condition (3), the positive power of the sixth lens group $G_6$ tends to decrease to a point where the back focus distance becomes too long and the overall length of the zoom lens becomes too long. Additionally, the beam height of light rays parallel to the optical axis X becomes so low that aberration correction becomes difficult.

The zoom lens of the present invention achieves favorable aberration correction, an appropriate back focus distance, a substantially telecentric state, and at the same time an optimum balance of image brightness, compactness, wide angle of view, and large zoom ratio. In addition, even with the large zoom ratio, compactness of the overall zoom lens length can be achieved by designing more efficiently the moving spaces for the lens groups. When the zoom lens is used in a projection display device, the appropriate back focus distance allows a color synthesizing optical system, and additional optical devices, to be inserted in the designated position. In addition, projection from a near distance to a large-sized screen can be realized based on the wide angle of view, while maintaining compactness of the zoom lens, and thus fully meeting the demands of recent years for such a zoom lens.

In particular, in the zoom lens of the present invention, variations in aberrations during zooming, especially variations in the middle range of zooming, can be reduced by providing a construction wherein four lens groups, namely, the second lens group $G_2$ with a positive refractive power, the third lens group $G_3$ with positive or negative refractive power, the fourth lens group $G_4$ with positive refractive power, and the fifth lens group $G_5$ with negative refractive power, move along the optical axis in order to continuously zoom and to correct the position of the image plane due to the continuous zooming. By having the second lens group $G_2$, the fourth lens group $G_4$, and the fifth lens group $G_5$ move toward the enlarging side when zooming from the wide-angle to the telephoto position, the moving spaces of these lens groups may be used more efficiently, and compactness can be maintained while increasing the zoom ratio. With the use of at least one negative lens component in the third lens group $G_3$ and the use of the four designated moving lens groups, a zoom lens of the present invention corrects the various aberrations, maintains a short overall length of the lens groups at all zoom settings, and achieves a compact zoom lens overall by being constructed so it satisfies Conditions (1) through (3) above. More specifically, the fifth lens group $G_5$ having negative refractive power and including a negative lens component of meniscus shape with its convex lens surface on the enlarging side enables satisfactory correction of chromatic aberration and field curvature. Additionally, the third lens group $G_3$ including at least one negative lens component and arranging that negative lens component at the reducing end of the third lens group $G_3$ enables satisfactory correction of lateral color.

Embodiments 1–3 of the present invention will now be individually described with reference to the drawings.

Embodiment 1

FIG. 1 shows the basic lens element configurations of the zoom lens of Embodiment 1. In Embodiment 1, the first lens group in order from the enlarging side, $G_1$, includes, in order from the enlarging side, a first lens element $L_1$ that is a biconvex lens element with its lens surface of greater curvature on the enlarging side, a second lens element $L_2$ that is a meniscus lens element having negative refractive power and with its convex lens surface on the enlarging side, and a third lens element $L_3$ that is a biconcave lens element with its lens surface of greater curvature on the enlarging side. The second lens group in order from the enlarging side, $G_2$, includes, in order from the enlarging side, a fourth lens element $L_4$ that is a meniscus lens element having positive refractive power and with its convex lens surface on the reducing side and a fifth lens element $L_5$ that is a meniscus lens element having positive refractive power and with its convex lens surface on the enlarging side. The third lens group in order from the enlarging side, $G_3$, includes a sixth lens element $L_6$ that is a biconcave lens element with its lens surface of greater curvature on the reducing side. The fourth lens group in order from the enlarging side, $G_4$, includes, in order from the enlarging side, a lens component formed of a seventh lens element $L_7$ that is a meniscus lens element having negative refractive power and with its convex lens surface on the enlarging side and an eighth lens element $L_8$ that is a biconvex lens element with its lens surface of greater curvature on the enlarging side and that is cemented to the seventh lens element $L_7$. The fifth lens group in order from the enlarging side, $G_5$, includes a ninth lens element $L_9$ that is a meniscus lens element having negative refractive power with its convex lens surface on the enlarging side. The sixth lens group in order from the enlarging side, $G_6$, includes, in order from the enlarging side, a lens component formed of a tenth lens element $L_{10}$ that is a biconcave lens element with its lens surface of greater curvature on the enlarging side and an eleventh lens element $L_{11}$ that is a biconvex lens element with its lens surface of greater curvature on the reducing side and that is cemented to the tenth lens element $L_{10}$, a twelfth lens element $L_{12}$ that is a biconvex lens element with its lens surface of greater curvature on the reducing side, and a thirteenth lens element $L_{13}$ that is a biconvex lens element with its lens surface of greater curvature on the enlarging side.

Table 1 below lists the surface number #, in order from the enlarging side, the radius of curvature R of each surface, the on-axis surface spacing D, as well as the refractive index $N_d$ and the Abbe number $\nu_d$ (at the d-line) of each lens element for Embodiment 1. The numerical values of R and D are based on a normalized focal length of 1 at the wide-angle end configuration of the zoom lens of Embodiment 1 with the zoom lens focused at infinity. The zoom lens of Embodiment 1 provides a reducing magnification of −0.013 at the image reducing side at the wide-angle end of the zoom lens.

TABLE 1

| # | R | D | $N_d$ | $\nu_d$ |
|---|---|---|---|---|
| 1 | 2.138 | 0.241 | 1.51633 | 64.1 |
| 2 | −9.327 | 0.005 | | |
| 3 | 2.208 | 0.049 | 1.56384 | 60.7 |

TABLE 1-continued

| # | R | D | $N_d$ | $v_d$ |
|---|---|---|---|---|
| 4 | 0.726 | 0.341 | | |
| 5 | −1.252 | 0.043 | 1.70154 | 41.2 |
| 6 | 2.066 | $D_6$(variable) | | |
| 7 | −6.567 | 0.151 | 1.80400 | 46.6 |
| 8 | −1.404 | 0.005 | | |
| 9 | 1.295 | 0.169 | 1.80400 | 46.6 |
| 10 | 9.921 | $D_{10}$(variable) | | |
| 11 | −12.408 | 0.039 | 1.48749 | 70.2 |
| 12 | 1.623 | $D_{12}$(variable) | | |
| 13 | 1.415 | 0.029 | 1.83400 | 37.2 |
| 14 | 0.652 | 0.210 | 1.71300 | 53.9 |
| 15 | −3.283 | $D_{15}$(variable) | | |
| 16 | 1.644 | 0.029 | 1.80518 | 25.4 |
| 17 | 0.916 | $D_{17}$(variable) | | |
| 18 | −0.655 | 0.042 | 1.84666 | 23.8 |
| 19 | 2.955 | 0.235 | 1.62041 | 60.3 |
| 20 | −0.974 | 0.006 | | |
| 21 | 19.189 | 0.188 | 1.71300 | 53.9 |
| 22 | −1.392 | 0.005 | | |
| 23 | 1.936 | 0.180 | 1.84666 | 23.8 |
| 24 | −16.786 | 0.313 | | |
| 25 | ∞ | 0.979 | 1.51680 | 64.2 |
| 26 | ∞ | | | |

In the zoom lens of Embodiment 1, lens groups $G_2$, $G_3$, $G_4$, and $G_5$ move to vary the separations of the six lens groups during zooming. Therefore, the values of the on-axis spacings $D_6$, $D_{10}$, $D_{12}$, $D_{15}$, and $D_{17}$ vary.

Table 2 below lists the values of the variables $D_6$, $D_{10}$, $D_{12}$, $D_{15}$, and $D_{17}$ (i.e., the group spacings) at zoom ratios of 1.00, 1.15, and 1.30.

TABLE 2

| Zoom ratio | $D_6$ | $D_{10}$ | $D_{12}$ | $D_{15}$ | $D_{17}$ |
|---|---|---|---|---|---|
| 1.00 | 0.478 | 0.363 | 0.360 | 0.205 | 0.244 |
| 1.15 | 0.382 | 0.311 | 0.229 | 0.341 | 0.387 |
| 1.30 | 0.331 | 0.306 | 0.039 | 0.390 | 0.585 |

As set forth in Table 3 below, the zoom lens of Embodiment 1 of the present invention satisfies all of Conditions (1) through (3) above.

TABLE 3

| Condition No. | Condition | Value |
|---|---|---|
| (1) | $|F3|/F > 2.5$ | 2.941 |
| (2) | $0.7 < |F1|/F > 1.2$ | 0.904 |
| (3) | $1.1 < F6/F < 2.5$ | 1.343 |

Figure 4A:
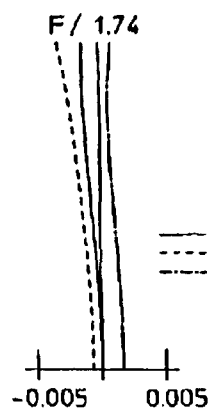
FIGS. 4A–4D show aberrations of the zoom lens of Embodiment 1 at the wide-angle end.
Figure 4B:
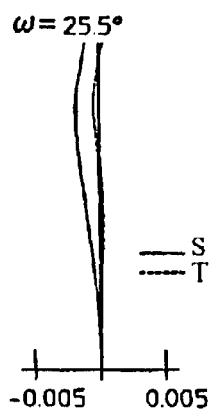
Figure 4C:
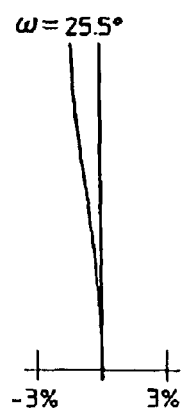
Figure 4D:
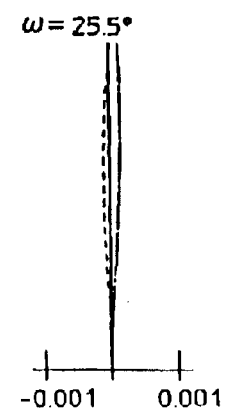
Figure 4E:
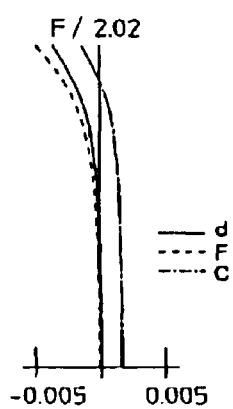
FIGS. 4E–4H show aberrations of the zoom lens of Embodiment 1 at an intermediate position.
Figure 4F:
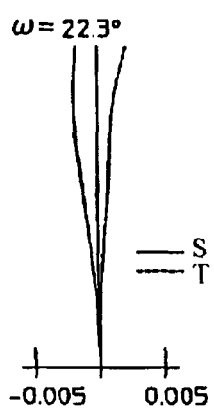
Figure 4G:
Figure 4H:
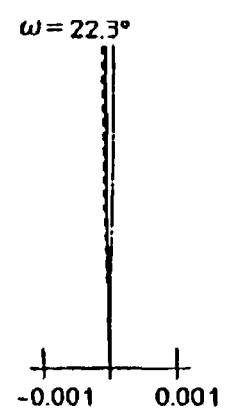
Figure 4I:
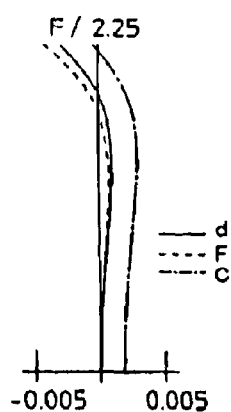
FIGS. 4I–4L show aberrations of the zoom lens of Embodiment 1 at the telephoto end.
Figure 4J:
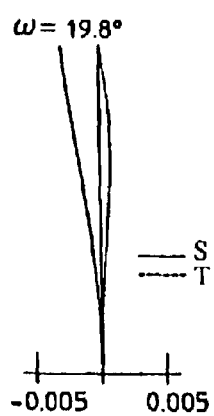
Figure 4K:
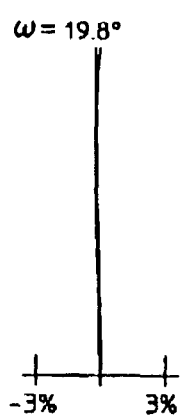
Figure 4L:
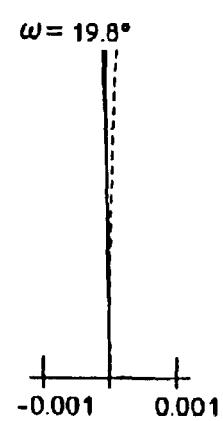

FIGS. 4A–4D show the spherical aberration, astigmatism, distortion, and lateral color, respectively, of the zoom lens of Embodiment 1 at the wide-angle end with a zoom ratio of 1.0. FIGS. 4E–4H show the spherical aberration, astigmatism, distortion, and lateral color, respectively, of the zoom lens of Embodiment 1 at an intermediate position with a zoom ratio of 1.15, and FIGS. 4I–4L show the spherical aberration, astigmatism, distortion, and lateral color, respectively, of the zoom lens of Embodiment 1 at the telephoto end with a zoom ratio of 1.30. In FIGS. 4A, 4E, and 4I, the spherical aberration is shown for the wavelengths 587.6 nm (the d-line), 486.1 nm (the F-line), and 656.3 nm (the C-line). In the remaining figures, ω is the half-image angle. In FIGS. 4B, 4F and 4J, the astigmatism is shown for both the sagittal image surface S and the tangential image surface T. In FIGS. 4C, 4G and 4K, distortion is measured at 587.6 nm (the d-line). In FIGS. 4D, 4H and 4L, the lateral color is shown for the wavelengths 486.1 nm (the F-line) and 656.3 nm (the C-line) relative to 587.6 nm (the d-line). As is apparent from these figures, the various aberrations are favorably corrected.

As is apparent from FIGS. 4A–4L as well as from Tables 1–3, the zoom lens according to Embodiment 1 provides satisfactory aberration correction over the entire zoom range, includes a suitable back focus distance, is nearly telecentric on the reducing side, and also provides a desirable balance of features of image brightness, compactness, width of the angle of view, and zoom ratio.

Embodiment 2

FIG. 2 shows the basic lens element configurations of the zoom lens of Embodiment 2. Embodiment 2 is similar to Embodiment 1 in that lens groups $G_1$ and $G_6$ remain stationary while lens groups $G_2$, $G_3$, $G_4$, and $G_5$ move during zooming adjustment.

In Embodiment 2, the first lens group in order from the enlarging side, $G_1$, includes, in order from the enlarging side, a first lens element $L_1$ that is a meniscus lens element having positive refractive power with its convex lens surface on the enlarging side, a second lens element $L_2$ that is a meniscus lens element having negative refractive power with its convex lens surface on the enlarging side, a third lens element $L_3$ that is a meniscus lens element having negative refractive power with its concave lens surface on the reducing side, and a lens component formed of a fourth lens element $L_4$ that is a biconcave lens element and a fifth lens element $L_5$ that is a meniscus lens element having positive refractive power with its convex lens surface on the enlarging side and that is cemented to the fourth lens element $L_4$. The second lens group from the enlarging side, $G_2$, includes, in order from the enlarging side, a sixth lens element $L_6$ that is a biconvex lens element with its lens surface of greater curvature on the reducing side, a seventh lens element $L_7$ that is a meniscus lens element having positive refractive power with its convex lens surface on the enlarging side, and an eighth lens element $L_8$ that is a meniscus lens element having positive refractive power with its convex lens surface on the enlarging side. The third lens group from the enlarging side, $G_3$, includes a ninth lens element $L_9$ that is a meniscus lens element having negative refractive power with its convex lens surface on the enlarging side. The fourth lens group from the enlarging side, $G_4$, includes a lens component formed of, in order from the enlarging side, a tenth lens element $L_{10}$ that is a meniscus lens element having negative refractive power with its convex lens surface on the enlarging side and an eleventh lens element $L_{11}$ that is a biconvex lens element with its lens surface of greater curvature on the enlarging side and that is cemented to the tenth lens element $L_{10}$. The fifth lens group from the enlarging side, $G_5$, includes a twelfth lens element $L_{12}$ that is a meniscus lens element having negative refractive power with its convex lens surface on the enlarging side. The sixth lens group from the enlarging side, $G_6$, includes, in order from the enlarging side, a lens component formed of, in order from the enlarging side, a thirteenth lens element $L_{13}$ that is a biconcave lens element with its lens surface of greater curvature on the enlarging side and a fourteenth lens element $L_{14}$ that is a biconvex lens element with its lens surface of greater curvature on the reducing side and that is cemented to the thirteenth lens element $L_{13}$, a fifteenth lens element $L_{15}$ that is a biconvex lens element with its lens surface of greater curvature on the reducing side, and a sixteenth lens element $L_{16}$ that is a biconvex lens element with its lens surface of greater curvature on the enlarging side.

Table 4 below lists the surface number #, in order from the enlarging side, the radius of curvature R of each surface, the on-axis surface spacing D, as well as the refractive index $N_d$ and the Abbe number $v_d$ (at the d-line) of each lens element for Embodiment 2. The numerical values of R and D are for a focal length of 0.999 at the wide-angle end with the zoom lens focused at infinity. The zoom lens of Embodiment 2 provides a reducing magnification of −0.013 at the image reducing side at the wide-angle end of the zoom lens.

TABLE 4

| # | R | D | $N_d$ | $v_d$ |
|---|---|---|---|---|
| 1 | 4.176 | 0.618 | 1.56384 | 60.7 |
| 2 | 12.333 | 0.008 | | |
| 3 | 2.436 | 0.135 | 1.80400 | 46.6 |
| 4 | 1.444 | 0.555 | | |
| 5 | 1.978 | 0.094 | 1.80400 | 46.6 |
| 6 | 1.162 | 0.456 | | |
| 7 | −3.789 | 0.094 | 1.80518 | 25.4 |
| 8 | 1.014 | 0.431 | 1.83400 | 37.2 |
| 9 | 2.159 | $D_9$(variable) | | |
| 10 | 5.863 | 0.122 | 1.80100 | 35.0 |
| 11 | −2.966 | 0.008 | | |
| 12 | 2.046 | 0.470 | 1.80100 | 35.0 |
| 13 | 17.200 | 0.008 | | |
| 14 | 1.188 | 0.065 | 1.48749 | 70.2 |
| 15 | 0.861 | $D_{15}$(variable) | | |
| 16 | 22.412 | 0.065 | 1.69680 | 55.5 |
| 17 | 2.283 | $D_{17}$(variable) | | |
| 18 | 1.532 | 0.049 | 1.63854 | 55.4 |
| 19 | 1.015 | 0.237 | 1.52249 | 59.8 |
| 20 | −2.318 | $D_{20}$(variable) | | |
| 21 | 1.281 | 0.048 | 1.60562 | 43.7 |
| 22 | 0.912 | $D_{22}$(variable) | | |
| 23 | −1.020 | 0.059 | 1.84666 | 23.8 |
| 24 | 4.206 | 0.397 | 1.48749 | 70.2 |
| 25 | −1.195 | 0.008 | | |
| 26 | 5.481 | 0.520 | 1.56384 | 60.7 |
| 27 | −1.810 | 0.008 | | |
| 28 | 4.479 | 0.517 | 1.80400 | 46.6 |
| 29 | −21.449 | 0.575 | | |
| 30 | ∞ | 1.464 | 1.51680 | 64.2 |
| 31 | ∞ | | | |

In the zoom lens of Embodiment 2, lens groups $G_2$, $G_3$, $G_4$, and $G_5$ move to vary the separations of the six lens groups during zooming. Therefore, the values of the on-axis spacings $D_9$, $D_{15}$, $D_{17}$, $D_{20}$, and $D_{22}$ vary.

Table 5 below lists the values of the variables $D_9$, $D_{15}$, $D_{17}$, $D_{20}$, and $D_{22}$ (i.e., the group spacings) at zoom ratios of 1.00, 1.12, and 1.25.

TABLE 5

| Zoom ratio | $D_9$ | $D_{15}$ | $D_{17}$ | $D_{20}$ | $D_{22}$ |
|---|---|---|---|---|---|
| 1.00 | 0.549 | 0.685 | 0.581 | 0.031 | 0.397 |
| 1.12 | 0.402 | 0.554 | 0.474 | 0.226 | 0.588 |
| 1.25 | 0.263 | 0.370 | 0.446 | 0.501 | 0.664 |

As set forth in Table 6 below, the zoom lens of Embodiment 2 of the present invention satisfies all of Conditions (1) through (3) above.

TABLE 6

| Condition No. | Condition | Value |
|---|---|---|
| (1) | $\|F3\|/F > 2.5$ | 3.653 |
| (2) | $0.7 < \|F1\|/F < 1.2$ | 0.923 |
| (3) | $1.1 < F6/F < 2.5$ | 2.231 |

Figure 5A:
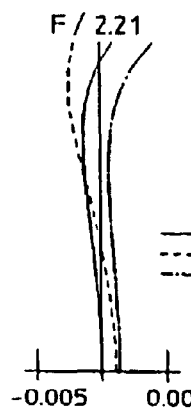
FIGS. 5A–5D show aberrations of the zoom lens of Embodiment 2 at the wide-angle end.
Figure 5B:
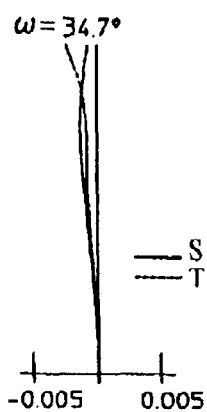
Figure 5C:
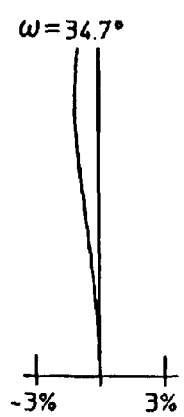
Figure 5D:
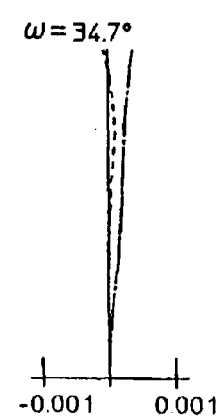
Figure 5E:
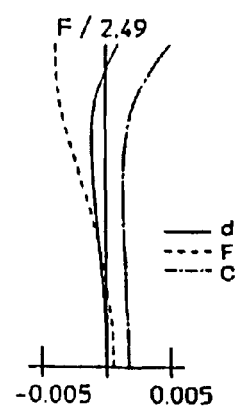
FIGS. 5E–5H show aberrations of the zoom lens of Embodiment 2 at an intermediate position.
Figure 5F:
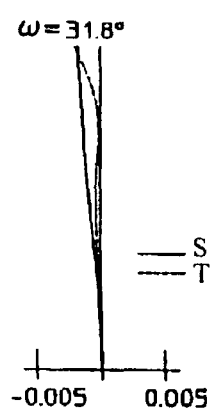
Figure 5G:
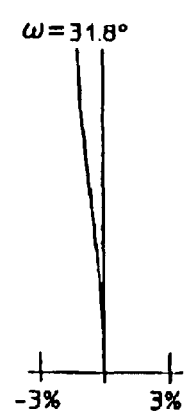
Figure 5H:
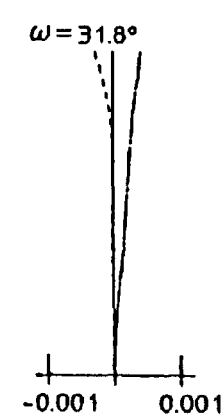
Figure 5I:
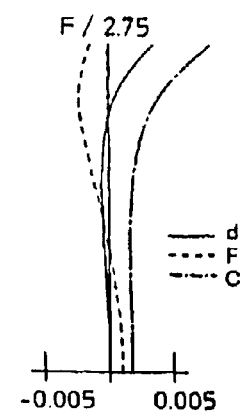
FIGS. 5I–5L show aberrations of the zoom lens of Embodiment 2 at the telephoto end.
Figure 5J:
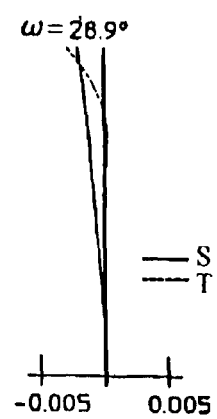
Figure 5K:
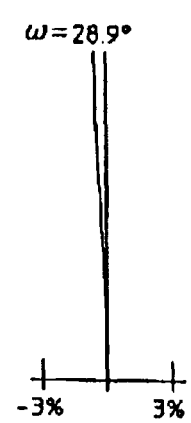
Figure 5L:
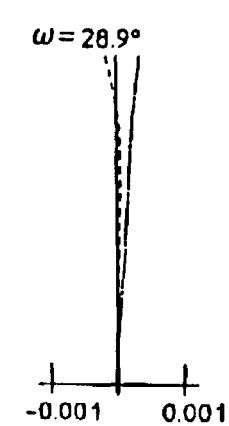

FIGS. 5A–5D show the spherical aberration, astigmatism, distortion, and lateral color, respectively, of the zoom lens of Embodiment 2 at the wide-angle end with a zoom ratio of 1.0. FIGS. 5E–5H show the spherical aberration, astigmatism, distortion, and lateral color, respectively, of the zoom lens of Embodiment 2 at an intermediate position with a zoom ratio of 1.12, and FIGS. 5I–5L show the spherical aberration, astigmatism, distortion, and lateral color, respectively, of the zoom lens of Embodiment 2 at the telephoto end with a zoom ratio of 1.25. In FIGS. 5A, 5E, and 5I, the spherical aberration is shown for the wavelengths 587.6 nm (the d-line), 486.1 nm (the F-line), and 656.3 nm (the C-line). In the remaining figures, ω is the half-image angle. In FIGS. 5B, 5F and 5J, the astigmatism is shown for both the sagittal image surface S and the tangential image surface T. In FIGS. 5C, 5G and 5K, distortion is measured at 587.6 nm (the d-line). In FIGS. 5D, 5H and 5L, the lateral color is shown for the wavelengths 486.1 nm (the F-line) and 656.3 nm (the C-line) relative to 587.6 nm (the d-line). As is apparent from these figures, the various aberrations are favorably corrected.

As is apparent from 5A–5L, as well as from Tables 4–6, the zoom lens according to Embodiment 2 provides satisfactory aberration correction over the entire zoom range, includes a suitable back focus distance, is nearly telecentric on the reducing side, and also provides a desirable balance of features of image brightness, compactness, width of the angle of view, and zoom ratio.

Embodiment 3

FIG. 3 shows the basic lens element configurations of the zoom lens of Embodiment 3. Embodiment 3 is similar to Embodiment 1 in that lens groups $G_1$ and $G_6$ remain stationary while lens groups $G_2$, $G_3$, $G_4$, and $G_5$ move during zooming adjustment.

In Embodiment 3, the first lens group $G_1$ in order from the enlarging side, includes, in order from the enlarging side, a first lens element $L_1$ that is a biconvex lens element with its lens surface of greater curvature on the enlarging side, a second lens element $L_2$ that is a meniscus lens element having negative refractive power with its convex lens surface on the enlarging side, and a third lens element $L_3$ that is a biconcave lens element with its lens surface of greater curvature on the enlarging side. The second lens group from the enlarging side, $G_2$, includes, in order from the enlarging side, a lens component formed of a fourth lens element $L_4$ that is a meniscus lens element having negative refractive power and with its concave lens surface on the reducing side and a fifth lens element $L_5$ that is a biconvex lens element with its lens surface of greater curvature on the enlarging side and that is cemented to the fourth lens element $L_4$, and a sixth lens element $L_6$ that is a biconvex lens element. The third lens group from the enlarging side, $G_3$, includes a lens component formed of a seventh lens element $L_7$ that is a meniscus lens element having positive refractive power with its convex lens surface on the reducing side and an eighth lens element $L_8$ that is a meniscus lens element of negative refractive power with its convex lens surface on the reducing side and that is cemented to the seventh lens element $L_7$. The fourth lens group from the enlarging side, $G_4$, includes a ninth lens element $L_9$ that is a meniscus lens element having positive refractive power with its convex lens surface on the reducing side. The fifth lens group from the enlarging side, $G_5$, includes, in order from the enlarging side, a tenth lens element $L_{10}$ that is a meniscus lens having negative refractive power with its convex lens surface on the enlarging side, and a lens component formed of, in order from the enlarging side, an eleventh lens element $L_{11}$ that is a biconcave lens element with its lens surface of greater curvature on the enlarging side and a twelfth lens element $L_{12}$ that is a biconvex lens element and that is cemented to the eleventh lens element L$_{11}$. The sixth lens group from the enlarging side, G$_6$, includes, in order from the enlarging side, a thirteenth lens element L$_{13}$ that is a biconvex lens element with its lens surface of greater curvature on the reducing side and a fourteenth lens element L$_{14}$ that is a biconvex lens element with its lens surface of greater curvature on the enlarging side.

Table 7 below lists the surface number #, in order from the enlarging side, the radius of curvature R of each surface, the on-axis surface spacing D, as well as the refractive index N$_d$ and the Abbe number v$_d$ (at the d-line) of each lens element for Embodiment 3. The numerical values of R and D are based on a normalized focal length of 1 at the wide-angle end with the zoom lens focused at infinity. The zoom lens of Embodiment 3 provides a reducing magnification of −0.013 at the image reducing side at the wide-angle end of the zoom lens.

TABLE 7

| # | R | D | N$_d$ | v$_d$ |
|---|---|---|---|---|
| 1 | 3.351 | 0.226 | 1.71300 | 53.9 |
| 2 | −227.505 | 0.006 | | |
| 3 | 2.674 | 0.071 | 1.49700 | 81.5 |
| 4 | 0.779 | 0.455 | | |
| 5 | −1.697 | 0.055 | 1.80518 | 25.4 |
| 6 | 2.288 | D$_6$(variable) | | |
| 7 | 440.723 | 0.055 | 1.84666 | 23.8 |
| 8 | 1.852 | 0.326 | 1.80610 | 40.9 |
| 9 | −2.198 | 0.093 | | |
| 10 | 3.281 | 0.205 | 1.84666 | 23.8 |
| 11 | −4.000 | D$_{11}$(variable) | | |
| 12 | −28.982 | 0.211 | 1.80610 | 40.9 |
| 13 | −1.403 | 0.053 | 1.68893 | 31.1 |
| 14 | −13.330 | D$_{14}$(variable) | | |
| 15 | −13.091 | 0.103 | 1.68893 | 31.1 |
| 16 | −2.037 | D$_{16}$(variable) | | |
| 17 | 1.344 | 0.038 | 1.51633 | 64.1 |
| 18 | 0.842 | 0.242 | | |
| 19 | −0.765 | 0.047 | 1.80518 | 25.4 |
| 20 | 1.505 | 0.361 | 1.62041 | 60.3 |
| 21 | −1.193 | D$_{21}$(variable) | | |
| 22 | 3.851 | 0.364 | 1.62041 | 60.3 |
| 23 | −1.644 | 0.006 | | |
| 24 | 2.884 | 0.236 | 1.71300 | 53.9 |
| 25 | −16.751 | 0.291 | | |
| 26 | ∞ | 1.228 | 1.51680 | 64.2 |
| 27 | ∞ | | | |

In the zoom lens of Embodiment 3, lens groups G$_2$, G$_3$, G$_4$, and G$_5$ move to vary the separations of the six lens groups during zooming. Therefore, the values of the on-axis spacings D$_6$, D$_{11}$, D$_{14}$, D$_{16}$, and D$_{21}$ vary.

Table 8 below lists the values of the variables D$_6$, D$_{11}$, D$_{14}$, D$_{16}$, and D$_{21}$ (i.e., the group spacings) at zoom ratios of 1.00, 1.13, and 1.30.

TABLE 8

| Zoom ratio | D$_6$ | D$_{11}$ | D$_{14}$ | D$_{16}$ | D$_{21}$ |
|---|---|---|---|---|---|
| 1.00 | 0.411 | 0.869 | 0.113 | 0.048 | 0.041 |
| 1.13 | 0.313 | 0.265 | 0.794 | 0.078 | 0.032 |
| 1.30 | 0.186 | 0.113 | 0.752 | 0.377 | 0.053 |

As set forth in Table 9 below, the zoom lens of Embodiment 3 of the present invention satisfies all of Conditions (1) through (3) above.

TABLE 9

| Condition No. | Condition | Value |
|---|---|---|
| (1) | \|F3\|/F > 2.5 | 9.281 |
| (2) | 0.7 < \|F1\|/F < 1.2 | 0.922 |
| (3) | 1.1 < F6/F < 2.5 | 1.252 |

Figure 6A:
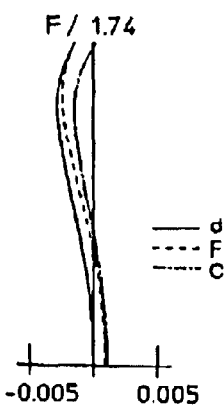
FIGS. 6A–6D show aberrations of the zoom lens of Embodiment 3 at the wide-angle end.
Figure 6B:
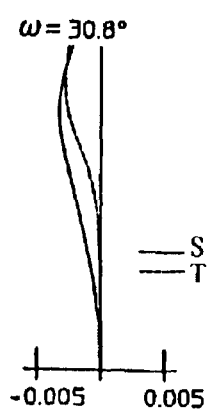
Figure 6C:
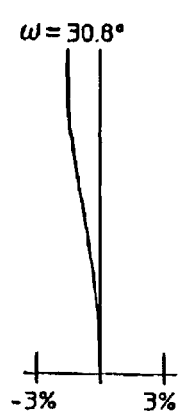
Figure 6D:
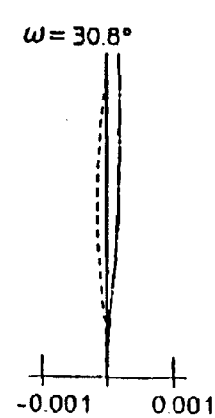
Figure 6E:
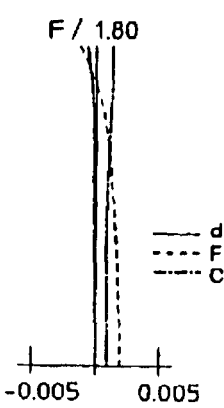
FIGS. 6E–6H show aberrations of the zoom lens of Embodiment 3 at an intermediate position.
Figure 6F:
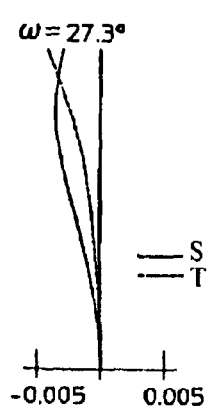
Figure 6G:
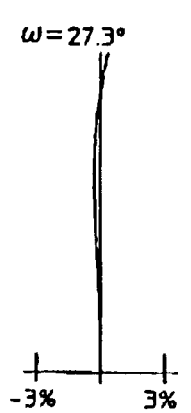
Figure 6H:
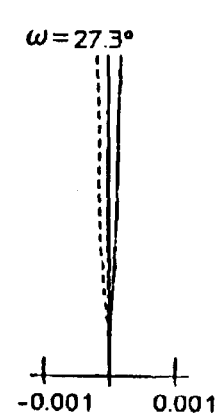
Figure 6I:
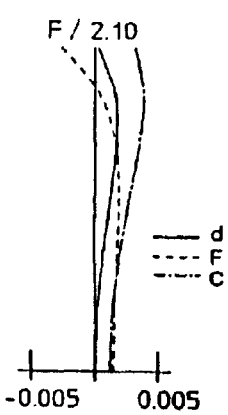
FIGS. 6I–6L show aberrations of the zoom lens of Embodiment 3 at the telephoto end.
Figure 6J:
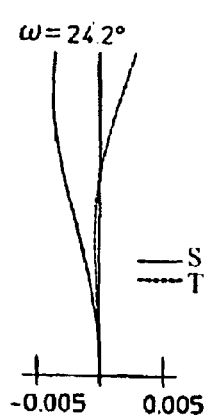
Figure 6K:
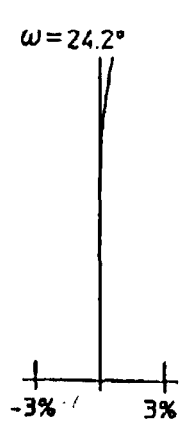
Figure 6L:
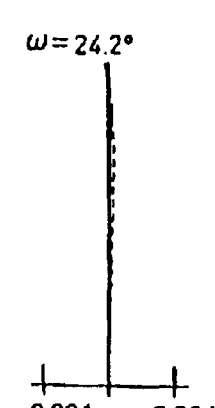

FIGS. 6A–6D show the spherical aberration, astigmatism, distortion, and lateral color, respectively, of the zoom lens of Embodiment 3 at the wide-angle end with a zoom ratio of 1.0. FIGS. 6E–6H show the spherical aberration, astigmatism, distortion, and lateral color, respectively, of the zoom lens of Embodiment 3 at an intermediate position with a zoom ratio of 1.13, and FIGS. 6I–6L show the spherical aberration, astigmatism, distortion, and lateral color, respectively, of the zoom lens of Embodiment 3 at the telephoto end with a zoom ratio of 1.30. In FIGS. 6A, 6E, and 6I, the spherical aberration is shown for the wavelengths 587.6 nm (the d-line), 486.1 nm (the F-line), and 656.3 nm (the C-line). In the remaining figures, ω is the half-image angle. In FIGS. 6B, 6F and 6J, the astigmatism is shown for both the sagittal image surface S and the tangential image surface T. In FIGS. 6C, 6G and 6K, distortion is measured at 587.6 nm (the d-line). In FIGS. 6D, 6H and 6L, the lateral color is shown for the wavelengths 486.1 nm (the F-line) and 656.3 nm (the C-line) relative to 587.6 nm (the d-line). As is apparent from these figures, the various aberrations are favorably corrected.

As is apparent from FIGS. 6A–6L, as well as from Tables 7–9, the zoom lens according to Embodiment 3 provides satisfactory aberration correction over the entire zoom range, includes a suitable back focus distance, is nearly telecentric on the reducing side, and also provides a desirable balance of features of image brightness, compactness, width of the angle of view, and zoom ratio.

Figure 7:
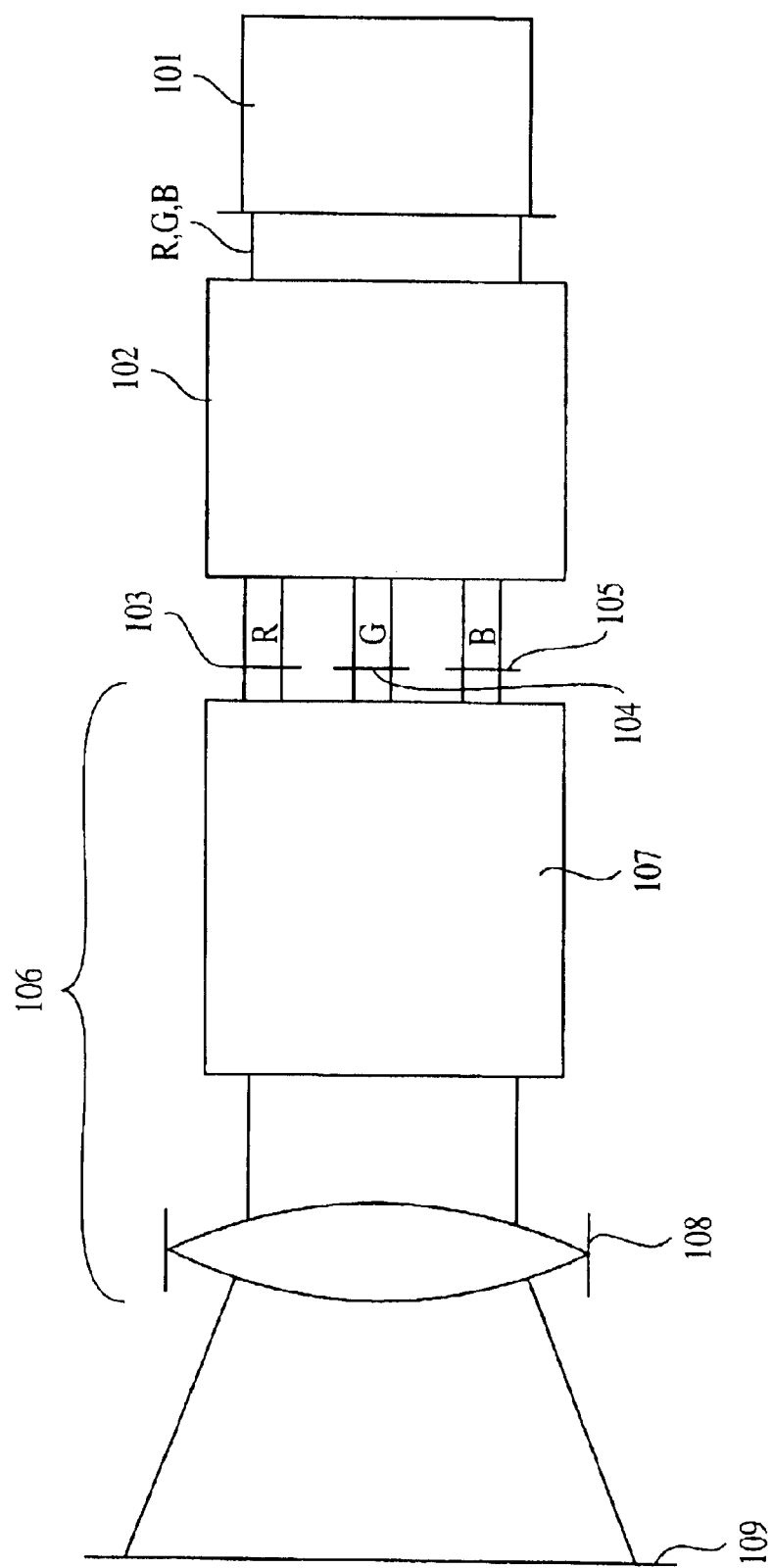
FIG. 7 shows a schematic representation of a projection display device in which a zoom lens of the present invention may be used.

An example of a projection display device in which a zoom lens of the present invention may be used is shown schematically in FIG. 7. As shown in FIG. 7, the projection display device includes a light source 101 that projects collimated light to a color separation optical system 102 that divides the light into red (R), blue (B), and green (G) light beams. The red, blue, and green light beams are separately modulated by transmission-type liquid crystal display elements 103, 104, and 105 that modulate the light in order to provide image information of different colors and are transmitted to a zoom projection lens 106 of the present invention. The zoom projection lens 106 includes a color synthesizing optical system 107 that combines the modulated red, blue, and green light beams into a single colored light beam for focusing by a zooming lens portion 108 that projects the combined color-modulated light beams onto a screen 109. The color separation optical system 102 may include a dichroic prism and a lens array and the color synthesizing optical system may also be a dichroic prism.

The present invention is not limited to the aforementioned embodiments, as it will be obvious that various alternative implementations are possible. For instance, the number of lens elements and lens components in each lens group may be varied. Additionally, values such as the radius of curvature R of each of the lens elements and components, the surface spacings D, the refractive index N$_d$, as well as the Abbe number v$_d$, are not limited to the examples indicated in each of the aforementioned embodiments, as other values can be adopted. Furthermore, the zoom lens according to the present invention is not limited to the form used as the projection lens of a projection display device that uses a reflection-type or a transmission-type liquid crystal display panel but may be used as a projection lens for devices that use other light modulation means, such as DMD's. Additionally, the zoom lens of the present invention may be used as an image forming lens in a camera, such as a camera using a camera tube, a CCD, or photographic film. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A zoom lens comprising, in order from the enlarging side:
    a first lens group having negative refractive power that is movable for focusing and that is stationary during zooming;
    a second lens group having positive refractive power that moves during zooming;
    a third lens group that moves during zooming;
    a fourth lens group having positive refractive power that moves during zooming;
    a fifth lens group having negative refractive power that moves during zooming; and
    a sixth lens group having positive refractive power that is stationary during zooming;
    wherein
    said second lens group, said third lens group, said fourth lens group, and said fifth lens group move relative to one another along the optical axis of the zoom lens during zooming;
    said second lens group and said fourth lens group move continuously nearer the enlarging side when the zoom lens zooms toward the telephoto end; and
    said fifth lens group is nearer the enlarging side when the zoom lens is at its telephoto end than when the zoom lens is at its wide-angle end.

2. The zoom lens of claim 1, wherein said fifth lens group includes a meniscus lens element with its convex lens surface on the enlarging side.

3. The zoom lens of claim 1, wherein the following condition is satisfied:

$$|F3|/F>2.5$$

where
    F3 is the focal length of said third lens group, and
    F is the focal length of the zoom lens at the wide-angle end when the zoom lens is focused at infinity on the enlarging side.

4. The zoom lens of claim 2, wherein the following condition is satisfied:

$$|F3|/F>2.5$$

where
    F3 is the focal length of said third lens group, and
    F is the focal length of the zoom lens at the wide-angle end when the zoom lens is focused at infinity on the enlarging side.

5. The zoom lens of claim 1, wherein the following condition is satisfied:

$$0.7<|F1|/F<1.2$$

where

F1 is the focal length of said first lens group, and
F is the focal length of the zoom lens at the wide-angle end when the zoom lens is focused at infinity on the enlarging side.

6. The zoom lens of claim 2, wherein the following condition is satisfied:

$$0.7<|F1|/F<1.2$$

where
    F1 is the focal length of said first lens group, and
    F is the focal length of the zoom lens at the wide-angle end when the zoom lens is focused at infinity on the enlarging side.

7. The zoom lens of claim 3, wherein the following condition is satisfied:

$$0.7<|F1|/F<1.2$$

where
    F1 is the focal length of said first lens group.

8. The zoom lens of claim 4, wherein the following condition is satisfied:

$$0.7<|F1|/F<1.2$$

where
    F1 is the focal length of said first lens group.

9. The zoom lens of claim 1, wherein the following condition is satisfied:

$$1.1<F6/F<2.5$$

where
    F6 is the focal length of said sixth lens group, and
    F is the focal length of the zoom lens at the wide-angle end when the zoom lens is focused at infinity on the enlarging side.

10. The zoom lens of claim 2, wherein the following condition is satisfied:

$$1.1<F6/F<2.5$$

where
    F6 is the focal length of said sixth lens group, and
    F is the focal length of the zoom lens at the wide-angle end when the zoom lens is focused at infinity on the enlarging side.

11. The zoom lens of claim 3, wherein the following condition is satisfied:

$$1.1<F6/F<2.5$$

where
    F6 is the focal length of said sixth lens group.

12. The zoom lens of claim 4, wherein the following condition is satisfied:

$$1.1<F6/F<2.5$$

where
    F6 is the focal length of said sixth lens group.

13. The zoom lens of claim 5, wherein the following condition is satisfied:

$$1.1<F6/F<2.5$$

where $F6$ is the focal length of said sixth lens group.

14. The zoom lens of claim 6, wherein the following condition is satisfied:

$$1.1 < F6/F < 2.5$$

where $F6$ is the focal length of said sixth lens group.

15. The zoom lens of claim 7, wherein the following condition is satisfied:

$$1.1 < F6/F < 2.5$$

where $F6$ is the focal length of said sixth lens group.

16. The zoom lens of claim 8, wherein the following condition is satisfied:

$$1.1 < F6/F < 2.5$$

where $F6$ is the focal length of said sixth lens group.

17. A projection display device comprising:

the zoom lens of claim 1;

a light source on the reducing side of the zoom lens; and a light modulator between the light source and the zoom lens for modulating light from the light source with image information;

wherein the zoom lens projects the modulated light to form an enlarged image on the enlarging side of the zoom lens.

18. A projection display device comprising:

the zoom lens of claim 2;

a light source on the reducing side of the zoom lens; and a light modulator between the light source and the zoom lens for modulating light from the light source with image information;

wherein the zoom lens projects the modulated light to form an enlarged image on the enlarging side of the zoom lens.

19. A zoom lens comprising, in order from the enlarging side and with no intervening lens elements:

a first lens group having negative refractive power that is movable for focusing and that is stationary during zooming;

a second lens group having positive refractive power that moves during zooming;

a third lens group that moves during zooming;

a fourth lens group having positive refractive power that moves during zooming;

a fifth lens group having negative refractive power that moves during zooming; and a sixth lens group having positive refractive power that is stationary during zooming;

wherein said second lens group, said third lens group, said fourth lens group, and said fifth lens group move relative to one another along the optical axis of the zoom lens during zooming;

said second lens group and said fourth lens group move continuously nearer the enlarging side when the zoom lens zooms toward the telephoto end; and said fifth lens group is nearer the enlarging side when the zoom lens is at its telephoto end than when the zoom lens is at its wide-angle end.

20. A zoom lens consisting of, in order from the enlarging side:

a first lens group having negative refractive power that is movable for focusing and that is stationary during zooming;

a second lens group having positive refractive power that moves during zooming;

a third lens group that moves during zooming;

a fourth lens group having positive refractive power that moves during zooming;

a fifth lens group having negative refractive power that moves during zooming; and a sixth lens group having positive refractive power that is stationary during zooming;

wherein said second lens group, said third lens group, said fourth lens group, and said fifth lens group move relative to one another along the optical axis of the zoom lens during zooming;

said second lens group and said fourth lens group move continuously nearer the enlarging side when the zoom lens zooms toward the telephoto end; and said fifth lens group is nearer the enlarging side when the zoom lens is at its telephoto end than when the zoom lens is at its wide-angle end.

21. The zoom lens of claim 1, wherein said third lens group includes at least one lens element having negative refractive power.

22. The zoom lens of claim 19, wherein said third lens group includes at least one lens element having negative refractive power.

23. The zoom lens of claim 20, wherein said third lens group includes at least one lens element having negative refractive power.

* * * * *

UNITED STATES PATENT AND TRADEMARK OFFICE
CERTIFICATE OF CORRECTION

PATENT NO. : 6,801,367 B2
DATED : October 5, 2004
INVENTOR(S) : Nagahara

It is certified that error appears in the above-identified patent and that said Letters Patent is hereby corrected as shown below:

Column 1,
Line 6, delete the comma after "lenses";

Column 7,
Line 48, Table 3, change "Condition (2)" to -- $0.7 < |F1|/ F < 1.2$ --; and Column 10,
Line 20, insert -- FIGS. -- before "5A - 5L".

Signed and Sealed this

Twenty-fifth Day of January, 2005

JON W. DUDAS
*Director of the United States Patent and Trademark Office*